United States Patent
Tin

(10) Patent No.: US 10,288,487 B2
(45) Date of Patent: May 14, 2019

(54) APPARATUS AND METHOD FOR MEMS RESONANT SENSOR ARRAYS

(71) Applicant: Honeywell International Inc., Morris Plains, NJ (US)

(72) Inventor: Steven Tin, Plymouth, MN (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/673,553

(22) Filed: Aug. 10, 2017

(65) Prior Publication Data

US 2019/0049309 A1    Feb. 14, 2019

(51) Int. Cl.
| | |
|---|---|
| G01J 5/10 | (2006.01) |
| G01J 5/02 | (2006.01) |
| H04N 5/33 | (2006.01) |
| G01J 5/00 | (2006.01) |

(52) U.S. Cl.
CPC .............. *G01J 5/10* (2013.01); *G01J 5/0215* (2013.01); *H04N 5/33* (2013.01); *G01J 2005/0077* (2013.01); *G01J 2005/106* (2013.01)

(58) Field of Classification Search
CPC .. G01J 5/046; G01J 5/0853; G01J 5/12; G01J 5/0215; G01J 5/0003; G01J 5/10; G01J 2005/0077; G01J 2005/106; H04N 5/332
USPC ......................................................... 250/340
See application file for complete search history.

(56) References Cited

U.S. PATENT DOCUMENTS

| | | | |
|---|---|---|---|
| 7,667,200 B1 | 2/2010 | Watts et al. | |
| 8,464,571 B1* | 6/2013 | Sparks | G01P 21/00 |
| | | | 702/104 |
| 9,097,578 B2 | 8/2015 | Raieszadeh et al. | |
| 2006/0038680 A1* | 2/2006 | Eskildsen | G08B 13/193 |
| | | | 340/567 |
| 2007/0108383 A1* | 5/2007 | Combes | G01J 5/44 |
| | | | 250/338.1 |

(Continued)

FOREIGN PATENT DOCUMENTS

WO        2013026006 A2    2/2013

OTHER PUBLICATIONS

Gokhale et al., "Sensitive Uncolled IR Detectors Using Gallium Nitride Resonators and Silicon Nitride Absorbers", "2012 Solid-State Sensors, Actuators and Microsystems Workshop, Hilton Head 2012", 2012, pp. 1-4, Publisher: Transducer Research Foundation, Published in: US.

(Continued)

*Primary Examiner* — Taeho Jo
(74) *Attorney, Agent, or Firm* — Fogg & Powers LLC

(57) ABSTRACT

A method is provided. The method comprises: transmitting a periodic chirp to at least two pixels of a MEMS sensor array; determining a resonant frequency of each MEMS resonant sensor receiving the periodic chirp; determining the change in resonant frequency of each MEMS resonant sensor receiving the periodic chirp; determining a power level incident upon each pixel receiving the periodic chirp. In one embodiment, the method further comprises calibrating the MEMS sensor array. In another embodiment, calibrating comprises generating a reference resonant frequency for each MEMS resonant sensor. In a further embodiment, determining the power level comprises determining a difference between the determined resonant frequency and the reference resonant frequency.

17 Claims, 7 Drawing Sheets

(56) References Cited

U.S. PATENT DOCUMENTS

| | | | | |
|---|---|---|---|---|
| 2008/0122453 | A1* | 5/2008 | Hunter | G01D 3/032 324/661 |
| 2009/0091370 | A1* | 4/2009 | Kawasaki | H03J 3/20 327/365 |
| 2009/0303570 | A1* | 12/2009 | Faraone | G02B 26/001 359/290 |
| 2010/0156629 | A1* | 6/2010 | Sexton | G01D 21/00 340/540 |
| 2011/0228809 | A1* | 9/2011 | Tadigadapa | G01K 7/32 374/31 |
| 2011/0254599 | A1* | 10/2011 | Dikshit | H03L 3/00 327/156 |
| 2011/0257706 | A1* | 10/2011 | Karr | A61N 1/37276 607/60 |
| 2012/0286161 | A1* | 11/2012 | Raieszadeh | G01J 5/06 250/338.3 |
| 2013/0130939 | A1* | 5/2013 | Wawro | G01N 21/253 506/18 |
| 2013/0192372 | A1* | 8/2013 | Colinet | G01H 13/00 73/579 |
| 2014/0049256 | A1* | 2/2014 | Smith | G01R 33/0286 324/259 |
| 2014/0250969 | A1* | 9/2014 | Alagarsamy | B81B 7/02 73/1.01 |
| 2015/0253193 | A1* | 9/2015 | Schilz | G01J 5/0025 250/342 |
| 2016/0033341 | A1* | 2/2016 | Tadigadapa | G01K 7/32 374/31 |
| 2016/0099701 | A1* | 4/2016 | Rinaldi | G01J 5/20 422/90 |
| 2016/0305835 | A1* | 10/2016 | Kollias | G01L 9/12 |
| 2017/0006386 | A1* | 1/2017 | Margalit | B81B 3/0021 |
| 2017/0023406 | A1* | 1/2017 | Kaufman | G01J 1/44 |
| 2017/0023429 | A1* | 1/2017 | Straeussnigg | H03M 3/336 |
| 2017/0163240 | A1* | 6/2017 | Rinaldi | G01J 5/046 |
| 2017/0331450 | A1* | 11/2017 | Rinaldi | G01J 5/046 |

OTHER PUBLICATIONS

Moosavifar et al, "An AlN-on-Si Resonant IR Sensor Array with a Large Temperature Coefficient of Frequency", "Sensors, 2016 IEEE", Jan. 9, 2017, pp. 1-3, Publisher: IEEE, Published in: US.

European Patent Office, "Extended European Search Report from EP Application No. 18187880.2 dated Dec. 21, 2018", "from Foreign Counterpart of U.S. Appl. No. 15/673,553", Dec. 21, 2018, pp. 1-7, Published in: EP.

* cited by examiner

APPARATUS AND METHOD FOR MEMS RESONANT SENSOR ARRAYS

BACKGROUND

Uncooled infrared (IR) sensor arrays measure environmental infrared radiation, and are used for image sensors such as night vision goggles. Uncooled infrared sensor arrays are formed from uncooled IR sensors. Microbolometers are a conventional uncooled IR sensor. Microbolometers have relatively high noise levels because of Johnson, flicker, and thermal fluctuation noise. Such high noise levels limit microbolometer, and thus IR sensor array, sensitivity. As a result, microbolometer and IR sensor array dynamic range is also limited. Therefore, there is a need for infrared sensor arrays using IR sensors having increased sensitivity.

SUMMARY

A method is provided. The method comprises: transmitting a periodic chirp to at least two pixels of a MEMS sensor array; determining a resonant frequency of each MEMS resonant sensor receiving the periodic chirp; determining the change in resonant frequency of each MEMS resonant sensor receiving the periodic chirp; determining a power level incident upon each pixel receiving the periodic chirp. In one embodiment, the method further comprises calibrating the MEMS sensor array. In another embodiment, calibrating comprises generating a reference resonant frequency for each MEMS resonant sensor. In a further embodiment, determining the power level comprises determining a difference between the determined resonant frequency and the reference resonant frequency.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
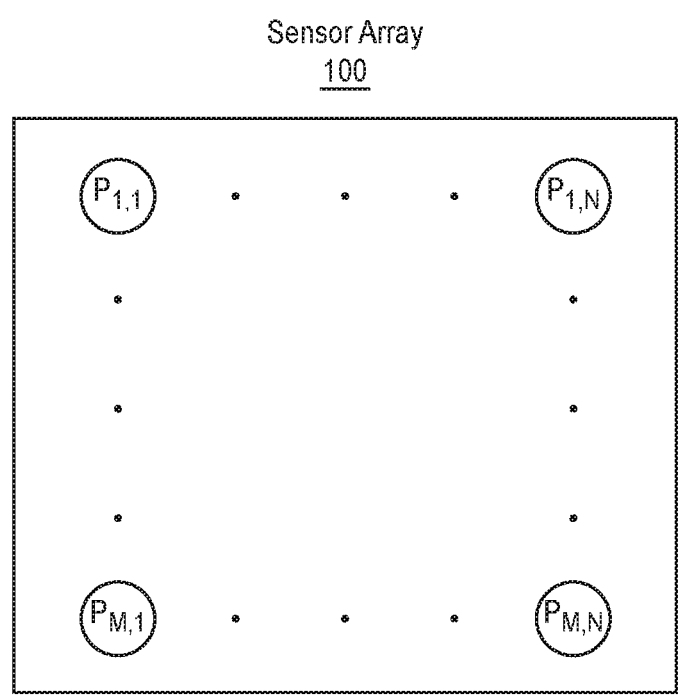
FIG. 1 illustrates a plan view of one embodiment of an array of MEMS infrared resonant sensors.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A micro-electro-mechanical system (MEMS) infrared (IR) resonant sensor may be used to overcome the above referenced problem. Embodiments of the MEMS IR sensor have at least one advantage: lower noise. MEMS IR resonant sensors have lower noise because they are only limited by thermal fluctuation noise. Although, MEMS IR resonant sensors are illustrated for pedagogical purposes, the embodiments described herein are applicable to MEMS resonant sensors (and arrays of MEMS resonant sensors). A MEMS resonant sensor is a sensor whose resonant frequency varies based upon the amount of incident signals of interest, which includes but not limited to infrared sensors, mass sensors, gas sensors, temperature sensors, inertial sensors, and magnetic sensor.

FIG. 1 illustrates a plan view of one embodiment of an array of MEMS infrared resonant sensors (sensor array) 100. In the illustrated embodiment, the array 100 has M rows and N columns with a total of M time N pixels shown as pixels $P_{1,1}$ through $P_{M,N}$. Each MEMS infrared resonant sensor may be referred to herein as a pixel P. In another embodiment, each of M and N are greater than one.

Figure 2:
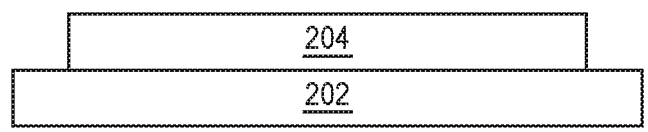
FIG. 2 illustrates a cross section of one embodiment of a MEMS infrared resonant sensor.

FIG. 2 illustrates a cross section of one embodiment of a MEMS infrared resonant sensor 200. The MEMS infrared resonant sensor 200 comprises a resonator 202 and an absorber 204. In another embodiment, the resonator 202 includes a material that converts mechanical energy to electrical energy (and vice versa), such as a bulk mode piezoelectric (e.g. aluminum nitride, gallium nitride, Y-cut quartz, and lithium niobate). The MEMS infrared resonant sensor 200 resonates at a resonant frequency that is dependent upon the dimensions and the temperature of the resonator 202.

In one embodiment, the absorber 204 is a dielectric (e.g. a polymer) which absorbs, e.g. IR wavelengths, energy, generating heat, and thus increasing the temperature of the resonator 202. Due to its change in temperature, the resonant frequency of the MEMS infrared resonant sensor 200 changes. In another embodiment, the absorber 204 is deposited on the resonator 202 using conventional semiconductor manufacturing techniques.

Figure 3A:
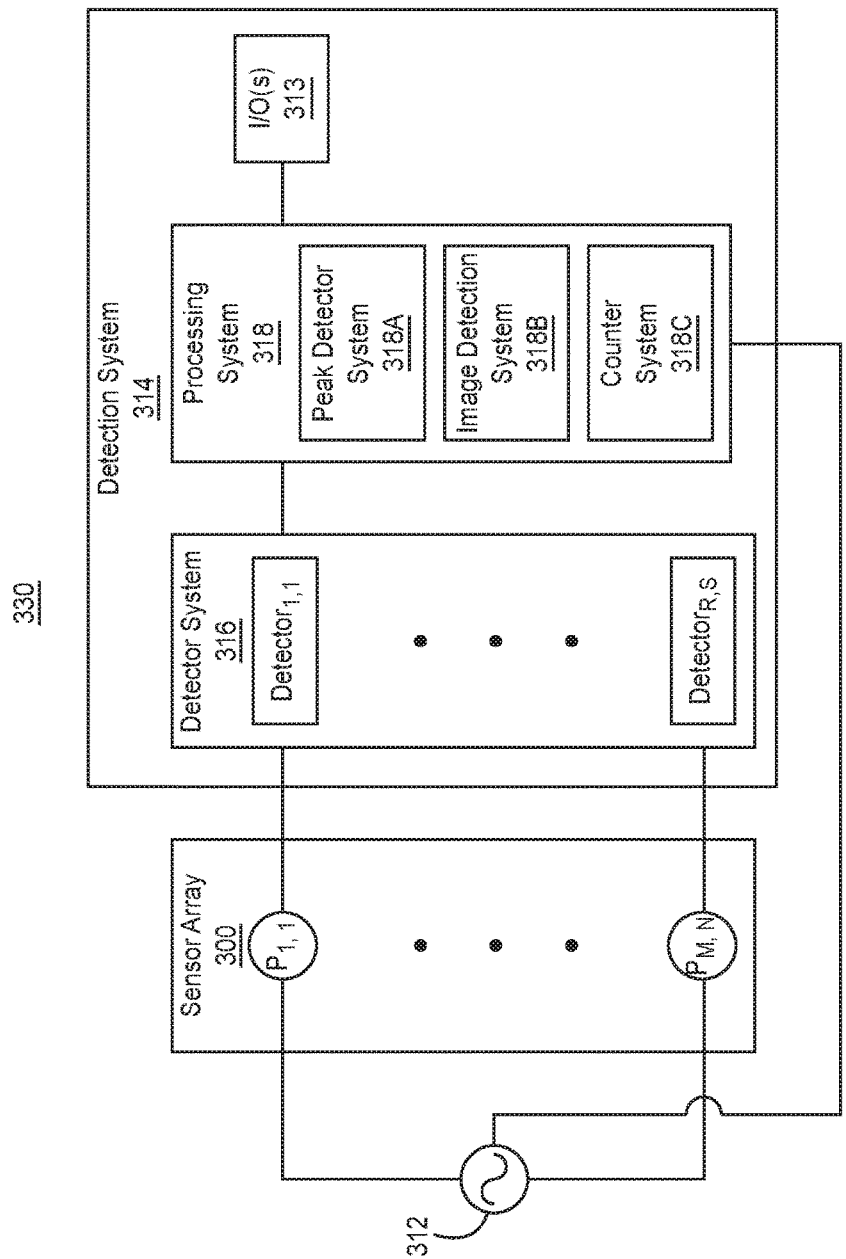
FIG. 3A illustrates one embodiment of a MEMS infrared resonant sensor array system.

FIG. 3A illustrates one embodiment of a MEMS infrared resonant sensor array system (sensor system) 330. The sensor system 330 includes an array of MEMS infrared resonant sensors (sensor array) 300 coupled to a signal generator system 312 and a detection system 314. In another embodiment, the sensor array 300 is implemented as described above with respect to FIG. 1.

In one embodiment, the signal generator system 312 generates a periodic frequency chirp signal (or periodic chirp) in the operating frequency range of the MEMS infrared sensors 200 in the sensor array 300, that increases in frequency (e.g. from 800 MHz to 1000 MHz) with time or decreases in frequency with time. In another embodiment, the periodic chirp has a frequency that linearly increases or decreases with time. Alternatively, the periodic chirp has a frequency that non-linearly increases or decreases with time. In a further embodiment, the signal generator system 312 includes one signal generator coupled to all pixels of the sensor array 300. In yet another embodiment, the signal generator system 312 includes two or more signal generators; for example, one signal generator may be uniquely coupled to a pixel of the sensor array 300.

Signal generators, such as signal generators that generate periodic chirps, may be fabricated on the same substrate as IR detectors via CMOS technologies. In one embodiment, signal generators are constructed with 555 timer circuitry and/or operational amplifiers.

The periodic chirp is propagated to the sensor array 300. The resonant frequency of one or more pixels P may be shifted due to infrared radiation incident on the one or more pixels P. The resulting signal output from the sensors array 300 reflects the shifted resonant frequenc(ies). This signal output from the sensor array 300 is propagated to the detector system 316 which determines the time or frequency of the peak amplitude of the, e.g. voltage or power, of the signal. If time is determined, then it is converted to frequency because each frequency of the periodic chirp corresponds to a unique time during the chirp.

Figure 3B:
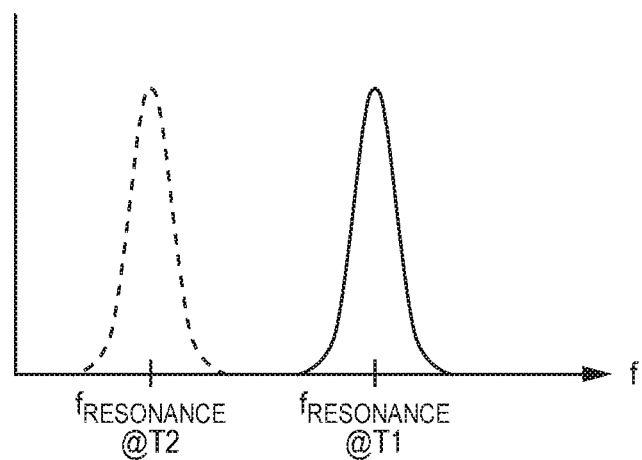
FIG. 3B illustrates one embodiment of the resonant frequencies of a pixel.

The shift in resonant frequency of a pixel P will now be illustrated. FIG. 3B illustrates one embodiment of the resonant frequencies of a pixel P 331. At a first temperature T1, e.g. room temperature, the resonant frequency of the MEMS infrared sensor 200 is $f_{RESONANCE\ @\ T1}$. When IR is incident upon the MEMS infrared sensor 200, the temperature of the MEMS infrared sensor 200 increases to a second temperature T2. Temperature T2 is larger than temperature T1. Because materials which may be used to make the resonator 202 have negative temperature coefficient of resonant frequency, the resonant frequency at the second temperature T2 ($f_{RESONANCE\ @\ T2}$) is less than $f_{RESONANCE\ @\ T1}$. In another embodiment, materials may be used that have a positive temperature coefficient of resonant frequency.

Returning to FIG. 3A, in one embodiment, the detection system 314 includes a detector system 316 coupled to a processing system 318. In another embodiment, as illustrated in FIG. 3A, the detector system 316 includes an array of R by S detectors comprising detector$_{1,1}$ 316a through detector$_{R,S}$ 316n; each pixel P in the sensor array 300 is coupled to a unique detector.

Figure 4:
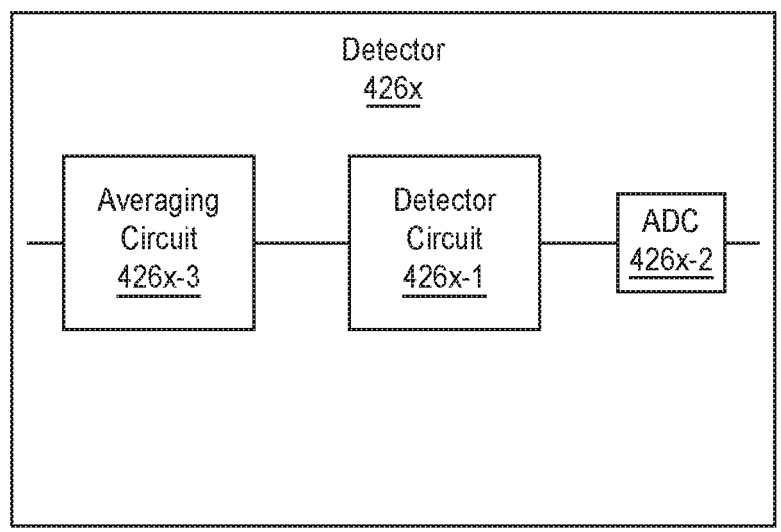
FIG. 4 illustrates one embodiment of a detector.

FIG. 4 illustrates one embodiment of a detector 416x. Each of the one or more detectors of the detector system 316 includes a detector circuit 416x-1 that generates an analog (voltage or current) signal related, e.g. proportional, to respectively the voltage or power incident on such detector circuit. In another embodiment, an analog to digital converter (ADC) 416x-2 is coupled to the output of one or more a detector circuits. In a further embodiment, a multiplexer may couple the output of two or more detector circuits to the input of the ADC 416x-2; each detector circuit is coupled to the ADC 416x-2 sequentially. Each analog to digital converter converts the analog signals generated by a detector circuit 416x-1 to digital signals that can be readily processed by digital systems.

Returning to FIG. 3A, in an alternate embodiment, the detection system 316 comprises at least one multiplexer coupled to two or more pixels. For example, a single multiplexer can be coupled to each pixel in the sensory array 300 and to a single detector. Using multiplexer(s), the detection system 316 can process signals from all pixels over time.

Returning to FIG. 4, in one embodiment, the detector 416x includes an averaging circuit 416x-3, such as an integrator circuit. The averaging circuit 426x-3 averages the resonant frequencies of pixel(s) over two or more periodic chirps. In the illustrated embodiment, the averaging circuit 416 is coupled between the sensor array 300 and a detector circuit 416x-1. Alternatively, in another embodiment, the averaging circuit 416x-3 can be coupled between the detector circuit 416x-1 and the ADC 416x-2.

Returning to FIG. 3, in one embodiment, the illustrated processing system 318 is implemented with a state machine such as a processor coupled to a memory. In another embodiment, a field programmable gate array and/or an application specific integrated circuit can be used in lieu of all or part of the processor and memory. In a further embodiment, the memory can be implemented with random access memory, read only memory, flash memory, and/or magnetic memory.

In one embodiment, the processing system 318 includes a peak detector system 318A, an image detection system 318B, and a counter system 318C. In another embodiment, the peak detector system 318A, the image detection system 318B, and the counter system 318C are stored and executed by the processing system 318. In a further embodiment, the counter system 318C is coupled to the signal generator system 312. In a further embodiment, the counter system 318C is a counter circuit. The counter system 318C may alternatively be located in the signal generator system 312, or elsewhere. The counter frequency is high enough to provide the desired frequency resolution, e.g. 1 Hz or less, to accurately determine the shift of the resonant frequency of the MEMS infrared resonant sensor.

The signal generator system 312 is configured to signal the counter system 318C to commence counting, e.g. from zero, at the commencement of each periodic chirp generated by the signal generator system 312. After a periodic chirp is completed, the counter system 318C resets and restarts counting, e.g. from zero, upon the commencement of a following periodic chirp. Each count corresponds to a frequency bin, or range, within the periodic chip.

The peak detector system 318A is configured to identify the resonant frequency of each pixel P in the sensor array 300. In one embodiment, for each pixel P in the sensor array 300, the peak detector system 318A identifies and stores the count of the counter system 318C corresponding to the maximum, or peak, measured amplitude. Using formulae and/or a lookup table database in the peak detection system 318A, the peak detection system 318A uses the stored count for each pixel to determine the corresponding frequency of the periodic chirp which is substantially the resonant frequency of that MEMS infrared resonant sensor. If the periodic chirp is linear, then the resonant frequency is defined by the measured count multiplied by a constant; for example, the constant would be the frequency range of the periodic chirp divided by the count range. The peak detector system 318A communicates the resonant frequency for each pixel P to the image detection system 318B.

Database as used herein means a conventional database or any other data storage technique, including a use of data files and/or registers. Two or more databases described herein may be combined into a single database.

In an alternative embodiment, the peak detector system 318A includes at least one fast Fourier transform (FFT(s)) (e.g., stored in the peak detector system 318A, and executed by the processing system 318). For example, with each chirp period, an FFT is performed on the output of the detector system 316 for each pixel, generating R bins of data. Each bin corresponds to a range of frequencies in the frequency range of the periodic chirp. In another embodiment, the bandwidth of each bin equals the frequency range of the periodic chirp divided by R. R may be selected by the system designer. For each cycle, the peak detector system 318A determines the bin having the largest amplitude. In yet a further embodiment, for each periodic chirp, the center frequency of the bin having the largest amplitude is identified as the resonant frequency for the corresponding pixel P.

The peak detector system 318A communicates the resonant frequency for each pixel P to the image detection system 318B.

The image detection system 318B is configured to determine the amplitude (e.g. the power) of incident infrared radiation upon each pixel P based upon resonant frequency shift. More specifically, as will be subsequently described, the image detection system 318B is configured to determine infrared radiation power incident upon each pixel P based upon a difference between the determined resonant frequency and a corresponding reference resonant frequency.

In one embodiment, the image detection system 318B includes a reference database that stores the resonant frequencies of each pixel P of the sensor array 300 when no infrared radiation is incident on the pixels; such resonant frequencies are termed reference resonant frequencies. The reference database, however, may be located elsewhere in the processing system 318. One method of obtaining reference resonant frequencies will be subsequently described.

The image detection system 318B determines the difference between the measured resonant frequency and the reference resonant frequency for each pixel P. For example, the difference is the reference resonant frequency subtracted from the measured resonant frequency. The difference is the resonant frequency shift. Using formulae and/or a lookup table database in the image detection system 318B, image detection system 318B determines the incident infrared power upon each pixel P.

Figure 5:
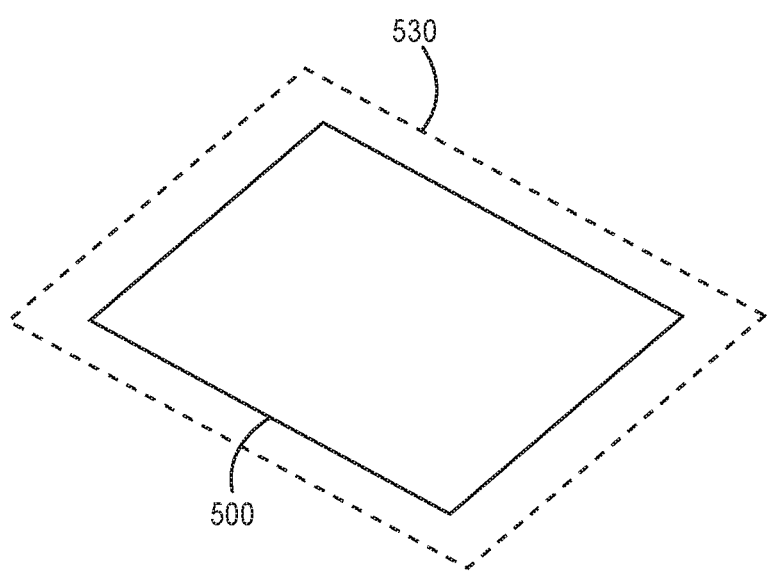
FIG. 5 illustrates a shutter system over a sensor array.

To compensate for varying environmental conditions (such as varying temperature) or time varying changes in pixel P performance (such as long term pixel resonant frequency drift due to sensor array 300 aging and/or degradation), the reference resonant frequency for each pixel P must be continuously or periodically re-measured. To accomplish this, in one embodiment, the sensor system 330 includes a shutter system 530 that isolates the sensor array 300 from incident infrared radiation. FIG. 5 illustrates the shutter system 530 over the sensor array 500. The shutter system 530 comprises a shutter. The shutter may be an electro-mechanical shutter akin to what is used in a camera. Alternatively, the shutter may be an electro-optical shutter, e.g. made from a liquid metal, liquid crystal, and/or other materials that can be electrically activated to block infrared radiation. In another embodiment, the shutter system 530 is coupled to the processing system 318 which controls the opening and closing of the shutter, e.g. with he image detection system 318B. The shutter is closed when the calibration is to be performed, e.g. determination of the reference resonant frequencies. In a further embodiment, the shutter system 530 includes a driver circuit which is configured to be coupled to the processing system 318 to convert digital control signals from the processing system 318 to analog signals that open and close the shutter.

When the shutter is activated, the infrared radiation is blocked from being incident upon the pixels P of the sensor array 300. The reference resonant frequencies of each pixel P (in the absence of infrared radiation) are measured using one of the techniques described above, and stored in the reference database. In one embodiment, the reference resonant frequencies are characterized prior to each measurement of environmental infrared radiation. However, the reference resonant frequencies need not be characterized that often, and can be measured periodically as often as needed, for example as controlled by the processing system and/or determined by a system designer.

Optionally, in one embodiment, a scale factor for each pixel may be measured. The scale factor is determined by having infrared radiation of an identical, constant power level incident upon each pixel P. If pixels generate different resonant frequencies, a scale factor can be calculated for each pixel. The scale factor for each pixel P is to be multiplied, e.g. by the detected voltage or power level or an initial determined resonant frequency corresponding to the respective pixel, to ensure that the same resonant frequency is determined for each pixel when the identical, constant infrared power level is incident upon the pixel P. For future measurements, the detected voltage or power level or determine resonant frequency for each pixel is multiplied by the scale factor so that, at least to first order, each pixel P has the same response to incident infrared radiation. Scale factors can be stored, e.g. in a scale factor database, in the processing system 318, for example in the image detection system 318B.

In one embodiment, scale factor calibration is performed in either the detector system 316 or the processing system 318, e.g. the image detection system 318B. Scale factor calibration can be performed as often as needed for a given application.

Returning to FIG. 3A, in one embodiment, at least one input/output device (I/O(s)) 313 is coupled to the processing system 318. The I/O(s) 313 can transmit and receive data and commands respectively generated by and externally for the sensor system 330. The I/O(s) 313 include a modem, a display (such as a touch screen), a keyboard, a cursor control device (such as a mouse), a speaker, and/or a microphone and voice recognition system. For example, the data can be transmitted to and received from a user that may be another system and/or a human being. In another embodiment, the I/O(s) 313 can be used to output, e.g. display the infrared radiation power levels incident upon the sensor array 300, for example as used in night vision goggles.

Figure 6:
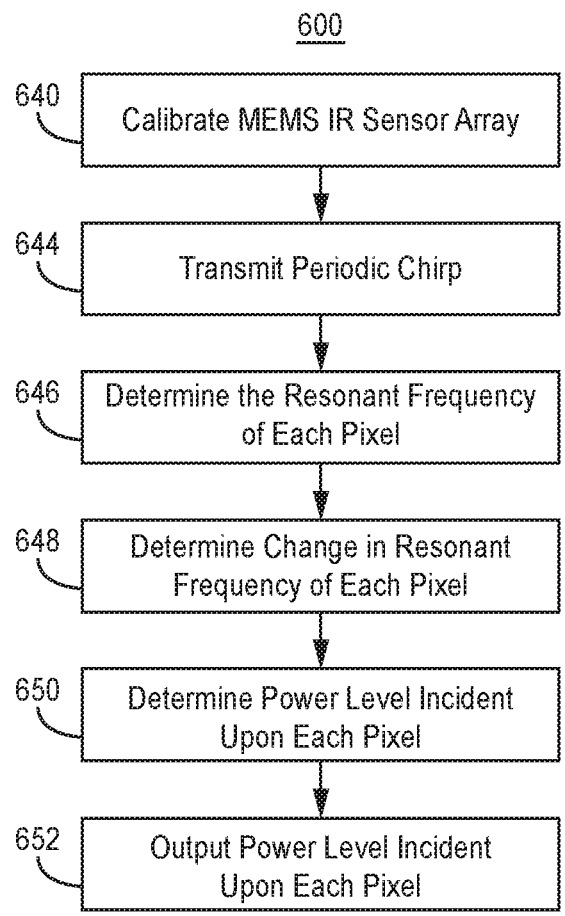
FIG. 6 illustrates one embodiment of a method of operation of MEMS infrared sensor array.

FIG. 6 illustrates one embodiment of a method of operation of MEMS IR sensor array 600. To the extent that the embodiment of method 600 shown in FIG. 6 is described herein as being implemented in the systems shown in FIGS. 1A through 2D, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figure) can occur in a different order (for example, where at least some of the processing associated with the blocks is performed in parallel and/or in an event-driven manner). Although infrared is referenced with respect to FIG. 6 for pedagogical reasons, the illustrated method is applicable to other MEMS resonant sensors.

In one embodiment, in block 640, calibrate an MEMS infrared sensor array. In another embodiment, calibrate by generating a reference resonant frequency for each pixel of the MEMS infrared sensor array, e.g. by closing a shutter and determining the resonant frequency of each pixel (as is further described above). In a further embodiment, perform calibration by performing the following blocks 644 and 646 when the shutter is closed. In yet another embodiment, calibrate by generating a scale factor for each pixel of the MEMS infrared sensor array, e.g. as described above.

In block 644, transmit the periodic chirp to at least two pixels, e.g. some or all, pixels, in the sensor array. In block 646, determine resonant frequency of each pixel receiving the periodic chirp, e.g. as described above. In block 648, determine a change in resonant frequency of each pixel receiving the periodic chirp, e.g. as described above. In block 650, determine a power level, e.g. of infrared radiation, incident upon each pixel receiving the periodic chirp, e.g. as described above. In one embodiment, in block 652, e.g. for the periodic chirp, output the power level incident upon each pixel.

Example Embodiments

Example 1 includes an apparatus, comprising: a signal generator system configured to generate periodic chirps; a detector system; a MEMS resonant sensor array comprising at least two MEMS resonant sensors coupled to the signal generator system and the detector system; and a processing system coupled to the detector system.

Example 2 includes the apparatus of Example 1, wherein the detector system comprises at least one detector.

Example 3 includes the apparatus of Example 2, wherein each detector comprises: a detector circuit; and an analog to digital converter coupled to the detector circuit.

Example 4 includes the apparatus of any of the Examples 1-3, wherein the processing system comprises: a peak detector system configured to determine a resonant frequency of each pixel in the MEMS resonant sensor array; an image detection system configured to determine infrared radiation power incident upon each pixel P based upon a difference between the determined resonant frequency and a corresponding reference resonant frequency; and wherein the image detection system comprises at least one of a reference database and a scale factor database.

Example 5 includes the apparatus of Example 4, wherein the apparatus further comprises a counter system coupled to the signal generator.

Example 6 includes the apparatus of any of Examples 1-5, further comprising a shutter system.

Example 7 includes the apparatus of Example 6, wherein the shutter system comprises an electro-optical shutter.

Example 8 includes the apparatus of any of Examples 1-7, wherein the periodic chirps linearly increase in frequency during each period.

Example 9 includes the apparatus of any of Examples 1-8, wherein each MEMS resonant sensor comprises: a resonator; and an absorber on the resonator.

Example 10 includes the apparatus of Example 9, wherein the absorber is an infrared absorber.

Example 11 includes an apparatus, comprising: a signal generator system configured to generate periodic chirps; a detector system comprising at least one detector, wherein each of the at least one detectors comprises a detector circuit coupled to an analog to digital converter; an infrared MEMS resonant sensor array comprising M rows and N columns of MEMS infrared resonant sensors coupled to the signal generator system and the detector system; and a processing system, coupled to the detector system, comprising: a peak detector system configured to determine a resonant frequency of each pixel in the MEMS resonant sensor array; an image detection system configured to determine infrared radiation power incident upon each pixel P based upon a difference between the determined resonant frequency and a corresponding reference resonant frequency; and wherein the processing system comprises at least one of a reference database and a scale factor database.

Example 12 includes the apparatus of Example 11, wherein the apparatus further comprises a shutter system coupled to the processing system.

Example 13 includes the apparatus of Example 12, wherein the shutter system comprises an electro-optical shutter.

Example 14 includes the apparatus of any of Examples 11-13, wherein the apparatus further comprises a counter coupled to the signal generator.

Example 15 is a method, comprising: transmitting a periodic chirp to at least two pixels of a MEMS sensor array; determining a resonant frequency of each MEMS resonant sensor receiving the periodic chirp; determining the change in resonant frequency of each MEMS resonant sensor receiving the periodic chirp; and determining a power level incident upon each pixel receiving the periodic chirp.

Example 16 includes the method of Example 15, further comprising calibrating the MEMS sensor array.

Example 17 includes the method of Example 16, where in calibrating comprises generating a reference resonant frequency for each MEMS resonant sensor.

Example 18 includes the method of any of Examples 15-17, wherein determining the power level comprises determining a difference between the determined resonant frequency and a reference resonant frequency.

Example 19 includes the method of any of Examples 15-18, wherein generating a periodic chirp comprises generating a periodic chirp having a linearly increasing frequency during a period.

Example 20 includes the method of any of Examples 15-19, wherein determining the resonant frequency comprises: identifying a count corresponding to a maximum measured amplitude detected from a MEMS resonant sensor; and converting the count to a resonant frequency of that MEMS resonant sensor.

Terms of relative position as used in this application are defined based on a plane parallel to, or in the case of the term coplanar—the same plane as, the conventional plane or working surface of a layer, wafer, or substrate, regardless of orientation. The term "horizontal" or "lateral" as used in this application are defined as a plane parallel to the conventional plane or working surface of a layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a layer, wafer, or substrate, regardless of orientation. The term "coplanar" as used in this application is defined as a plane in the same plane as the conventional plane or working surface of a layer, wafer, or substrate, regardless of orientation.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An apparatus, comprising:
  a signal generator configured to generate periodic chirps;
  detector circuit;
  a MEMS resonant sensor array comprising at least two pixels coupled to the signal generator system and the detector system;
  a processing circuit coupled to the detector circuit;
  a shutter coupled to the processing circuit, and configured, when activated, to isolate the MEMs resonant sensor array from incident radiation;
  wherein the detector circuit is configured to determine a reference resonant frequency for each of at least two pixels when the shutter activated, and at least one non-reference resonant frequency of each of at least two pixels when the shutter is not activated; and wherein the processing circuit is configured to determine at least one power level of the incident radiation upon each of at least two pixels using a corresponding reference resonant frequency and a corresponding non-reference reason frequency.

2. The apparatus et claim 1, wherein the detector circuit comprises at least one detector.

3. The apparatus of claim 1, wherein the processing circuit comprises:
 a peak detector system configured to determine a resonant frequency of each pixel in in the MEMS resonant sensor array;
 an image detection system configured to determine radiation power incident upon each pixel based upon a difference between the determined resonant frequency and a corresponding reference resonant frequency; and
wherein the image detection system comprises at least one of a reference database and a scale factor database.

4. The apparatus of claim 3, wherein the apparatus further comprises a counter system coupled to the signal generator.

5. The apparatus of claim 1, wherein the shutter comprises an electro-optical shutter.

6. The apparatus of claim 1, wherein the periodic chirps linearly increase in frequency during each period.

7. The apparatus of claim 1, wherein each pixel comprises:
 a resonator; and
 an absorber on the resonator.

8. The apparatus of claim 7, wherein the absorber is an infrared absorber.

9. An apparatus, comprising:
 a signal generator configured to generate periodic chirps;
 a detector system comprising at least one detector, wherein each of the at least one detectors comprises a detector circuit coupled to an analog to digital converter;
 a MEMS infrared resonant sensor array comprising M rows and N columns of pixels coupled to the signal generator and the detector system; and
 a processing circuit, coupled to the detector system, comprising:
 a peak detector system configured to determine a resonant frequency of each pixel in the MEMS infrared resonant sensor array;
 an image detection system configured to determine infrared radiation power incident upon each pixel based upon a difference between the determined resonant frequency and a corresponding reference resonant frequency; and
 wherein the processing circuit comprises at least one of a reference database and a scale factor database.

10. The apparatus of claim 9, wherein the apparatus further comprises a shutter system coupled to the processing circuit.

11. The apparatus of claim 10, wherein the shutter system comprises an electro-optical shutter.

12. The apparatus of claim 9, wherein the apparatus further comprises a counter coupled to the signal generator.

13. A method, comprising:
 calibrating a MEMS resonant sensor array by isolating the MEMs resonant sensor array from incident radiation when a shutter is closed to permit determination of reference resonant frequencies of each pixel in the MEMS resonant sensor array:
 transmitting a periodic chirp to at least two pixels of a MEMS resonant sensor array;
 determining a resonant frequency of each pixel receiving the periodic chirp;
 determining the change in resonant frequency of pixel receiving the periodic chirp; and
 determining a power level incident upon each pixel receiving the periodic chirp.

14. The method of claim 13, where in calibrating comprises generating a reference resonant frequency for each pixel.

15. The method of claim 13, wherein determining the power level comprises determining a difference between the determined resonant frequency and a reference resonant frequency.

16. The method of claim 13, wherein generating a periodic chirp comprises generating a periodic chirp having a linearly increasing frequency during a period.

17. The method of claim 13, wherein determining the resonant frequency comprises:
 identifying a count corresponding to a maximum measured amplitude detected from a pixel; and
 converting the count to a resonant frequency of that pixel.

* * * * *